B. AHRENS & D. GERHARD.
Car-Axles.
No. 142,757.  Patented September 16, 1873.
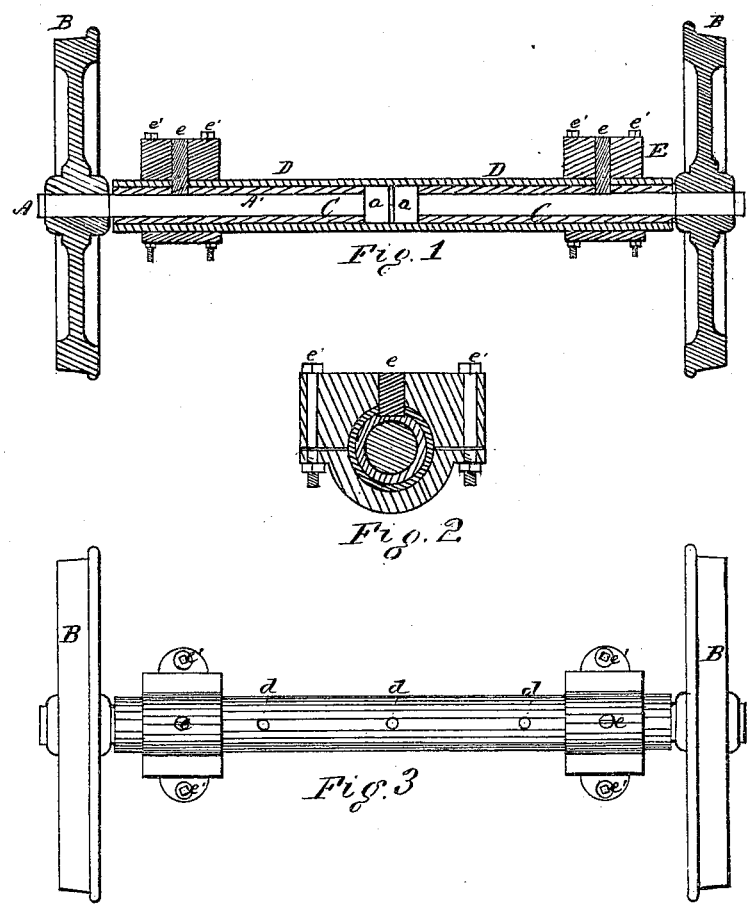

UNITED STATES PATENT OFFICE.

BENNEVILLE AHRENS AND DANIEL GERHARD, OF READING, PA.

IMPROVEMENT IN CAR-AXLES.

Specification forming part of Letters Patent No. 142,757, dated September 16, 1873; application filed July 30, 1873.

*To all whom it may concern:*

Be it known that we, BENNEVILLE AHRENS and DANIEL GERHARD, of Reading, in the county of Berks and State of Pennsylvania, have invented a certain new and useful Improvement in Axles; and we do hereby declare the following to be a full, clear, and exact description of the invention, such as will enable others skilled in the art to which it pertains to make and use it, reference being had to the accompanying drawings, which form part of this specification, in which—

Figure 1 is a vertical central section, Fig. 2 a transverse section, and Fig. 3 a side view, of our invention.

Our invention has for its object an improved construction of car and other axles; and it relates to that style of axle which is divided centrally, so that the wheels may revolve independently of each other. Our improvements consist in the construction and combination of parts as hereinafter more fully described, having reference particularly to providing each section of the axle with a collar or shoulder at or about the inner end thereof, and in combining with said sections a series of tubes, within which the axle revolves.

Referring to the accompanying drawing, A shows the axle, which is formed in two parts or sections, A' A', provided each with a shoulder or collar, a. B B are the wheels, securely fastened upon the axle by suitable means. C C are tubes fitted upon the axle, and within which it revolves, said tubes being fitted in an outer tube, D, and made fast thereto by means of screws e e in the bearings E. d d represent oil-holes in the tubes, by means of which the axle is lubricated, and e' are pins or screws securing the tubes and bearings together. By the aforesaid construction the axle, it will be seen, can revolve freely within the tubes C C, which prevent it from coming out, owing to the collars or shoulders a a. When necessary the axle may be withdrawn by removing the screws e e, permitting the tubes C C to be slided out of the tube D.

In turning curves, where one wheel moves faster than another, this construction will be found of advantage; also, in "filler" carts or barrows, where, in turning around, one wheel goes forward and the other backward. So, too, by this construction, the wheel may be made fast on the axle, thereby preventing dirt from getting into and wearing out the hub.

What we claim as our invention is—

In combination with the divided axle A, having the collars or shoulders a a, the tubes C C and D, substantially as described.

In testimony that we claim the foregoing we have hereunto set our hands this 24th day of July, 1873.

BENNEVILLE AHRENS.
   DANIEL GERHARD.

Witnesses:
 B. FRANK. DETHU,
 SYLVESTER S. GRETH.